July 9, 1940.  J. C. CROWLEY  2,206,881

FASTENING DEVICE AND METHOD OF MAKING SAME

Filed Aug. 10, 1939

INVENTOR.
JOHN C. CROWLEY
BY Kwis Hudson & Kent
ATTORNEYS

Patented July 9, 1940

2,206,881

UNITED STATES PATENT OFFICE 2,206,881

FASTENING DEVICE AND METHOD OF MAKING SAME

John C. Crowley, Cleveland Heights, Ohio, assignor to The Dill Manufacturing Company, Cleveland, Ohio, a corporation of Ohio Application August 10, 1939, Serial No. 289,443

6 Claims. (Cl. 10—27)

This invention relates to a fastening device and to a method of making the same.

The fastening device contemplated by the present invention is similar to the fastening device shown in Anderson Patent No. 2,051,066, August 18, 1936, and constitutes an improvement thereon.

The method contemplated by the present invention, as now visualized, can be employed most usefully in making fastening devices such as the devices referred to above, but it should be understood that its utility may have application in other and less limited fields.

A fastening device such as shown in said Patent No. 2,051,066, or as disclosed herein, can be used very advantageously in making a connection to a plate where access can be had to one side only of the plate. One situation wherein a fastening device of this type has particular practical utility is in the building or repairing of airplanes, whereis in many instances are present where a plate must be fastened on the outer side of another plate where the plates are not accessible from both sides, as for example, in securing fillet plates in position at the juncture of the wings and fuselage or at other points to streamline the airplane.

A fastening device such as shown in said Patent No. 2,051,066 comprises two separable members or main parts, one of which may be called the outer part or member and is in the form of a sleeve or thimble of such diameter that it can be passed through an opening in the plate or plates to which the fastening is to be applied. One end of the outer member is closed except for a diametrically extending slot or opening, the purpose of which will later be explained and which slot or opening is ordinarily formed by a punching operation. The opposite end of the outer member or part is expansible for a portion of the length of the member, while intermediate the closed end and the expansible end the member or part is interiorly threaded.

The other member or part of the fastening device of Patent No. 2,051,066 is an expander member and comprises an exteriorly threaded shank of a diameter such as to screw into the interiorly threaded portion of the outer member or part and said shank terminates in an enlarged conical shoulder which when the inner or other member is screwed fully into the outer member acts to expand the expansible portion of said outer member. The outer end of the conical portion of said other or inner member has integrally formed therewith an enlarged head or flange.

The inner member is provided with a bore therethrough to rotatably receive a rod having a sharpened or screwdriver end portion that extends through the slot or opening in the closed end of the outer member. The rod forms part of a tool for applying the device, the other part of which may be in the form of a sleeve rotatable on the rod but of less length than the rod and having on its ends projections engageable with grooves formed in the flange or head of the inner member of the fastening device. The tool enables the outer member and the inner member of the fastening device to be rotated relative to each other and thus to be capable of being applied from one side only of a plate or plates.

As previously stated, the fastening device has particular utility in connection with the manufacture or repair of airplanes. However, since the outer member of the fastening device is provided with the diametrically extending slot or opening, the device is not as advantageously used in connection with sea planes or amphibian planes as with purely land planes, since water gets into the interior of the device when the sea plane or amphibian plane is taking off or landing, thus causing corrosion and rusting of the device. It should be understood that the exposed end of the bore through the inner member of the fastening device is ordinarily closed by a removable closure member inserted into said bore, since this end of the device is accessible for such purpose.

An object of the present invention is to provide an improvement on the fastening device shown in Patent 2,051,066 and one wherein the outer member of the device has its end that receives the end of the applying tool and is remote from the expansible portion closed against the entrance of moisture, dirt or other foreign matter.

It is customary to manufacture fastening devices of the character specified by stamping, boring, machining and punching operations and another object of the present invention is to provide a method of manufacturing such devices by means of such operations and to provide the remote ends of the outer members of the devices by means of a punching operation with a tool receiving slot while by the same kind of an operation closing and sealing said slot from the outside by the material severed from the members to form the slot.

Further and additional objects and advantages not hereinbefore specified will become apparent during the detailed description which is to follow of an embodiment of the invention. Referring to the accompanying drawing, Fig. 1 is an elevational view of the fastening device on a greatly enlarged scale, with the inner member telescoped within the outer or thimble member.

Figure 1:
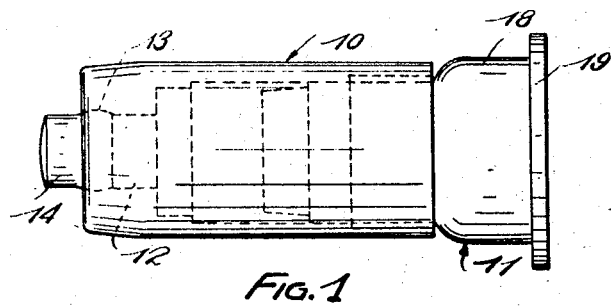
Figure 3:
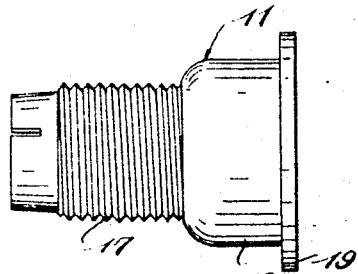
Fig. 3 is an elevational view of the inner or expander member of the fastening device detached from the outer or thimble member.
Figure 2:
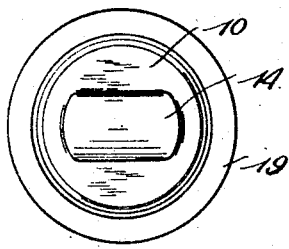
Fig. 2 is an end elevational view of the fastening device looking from the left-hand end of Fig. 1.
Figure 4:
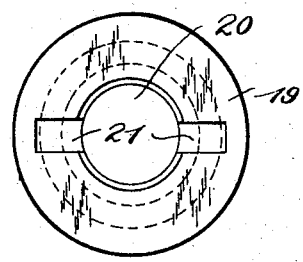
Fig. 4 is an end elevational view of the inner member of the device and is taken looking from the right-hand end of Fig. 3.

The fastening device comprises two separable members or main parts, namely, the outer thimble member or part 10 and the inner expander member or part 11. The outer member or part 10 is in the form of a sleeve or thimble of such diameter that it can be passed through an opening in the plate or plates to which the fastening is to be applied. One end of the outer member is closed, i. e., the left-hand end as viewed in the drawing. This end of the outer member 10 is remote from the open end of the member and is provided with a slot or recess 12 that communicates with the interior of the member but is closed to the outside of the member. The slot or recess 12 is closed by the material punched out of the member to form the slot or recess, which material after being ruptured or severed from the member and displaced by a punch to form said slot or recess is swaged or riveted by a punching operation into interlocked substantially integral relationship with the member as indicated at 13, a portion of such material extending beyond the end of the member and forming a knob or projection 14. The formation of the recess or groove 12 and the swaging or riveting of the material displaced therefrom are preferably carried out by punching operations, as will later be explained in connection with the method of manufacturing the device. The slot or recess 12 extends diametrically of the outer member 10 and the purpose of providing such recess or slot is to receive the end of a part of an applying tool such that the outer member 10 and the inner member 11 can be relatively rotated when the fastening device is applied to a plate or plates. The open end of the member 10 is provided with a portion 15 that is expansible, while intermediate the ends of the member 10 there is an interiorly threaded portion 16.

The inner or expander member 11 of the device comprises a shank having an exteriorly threaded portion 17 of a diameter such as to screw into the interiorly threaded portion 16 of the outer member 10, and said shank terminates in an enlarged conical shoulder portion 18 which when the inner member 11 is screwed fully into the outer member 10 acts to expand the expansible portion 15 of said member 10. The outer end of the conical portion 18 of the member 11 has integrally formed therewith an enlarged head or flange 19. The member 11 is provided with a bore 20 extending therethrough, wherefore that portion of the applying tool previously referred to and which has its end in the recess or slot 12 of the member 10 can be passed through the member 11 to operative position. The member 11 is provided with a pair of diametrically located grooves 21 preferably formed in a countersink in the flange or head 19 and terminating at the bore 20. The grooves 21 receive projections on the end of another part of the applying tool which is relatively rotatable to the first mentioned part of the tool and wherefore it will be seen that when the tool is inserted in the fastening device with the end of one part in the slot or recess 12 and with the projections of the other part in the grooves 21, the members 10 and 11 of the fastening device can be relatively rotated so that the member 11 screws into the member 10.

In practice the bore 20 through the member 11 may be threaded for a portion of its length so that a detachable closure element (not shown) can be mounted therein after the fastening device has been applied, and such closure element will seal this end of the fastening device against the ingress of moisture, dirt or other foreign matter. Similarly, since the opposite end of the fastening device is closed and sealed by the plug 14 no dirt, moisture or other foreign matter can enter the device at this end. The sealing of the end of the member 10 by the plug 14 is extremely important, particularly when the fastening device is used on amphibian planes or sea planes, as water could otherwise get into the interior of the fastening device when the planes were landing or taking off, thus causing deleterious rusting and corroding of the device, particularly if the water entering the same were salt water.

It will thus be seen that the fastening device of the present invention constitutes an improvement over the fastening device shown in said Anderson Patent 2,051,066, wherein the end of the outer member of the device remote from the opening in the plate is not sealed against the entrance of moisture, dirt or other foreign matter.

Fastening devices such as disclosed herein are usually made by stamping, boring, punching and machining operations. In manufacturing the device it will be understood that the portions 15 and 16 of the member 10 may be formed by the usual boring and machining operations. Heretofore it has been customary to form the slot or opening in the closed end of the outer member of the device by a punching operation, wherein a punch is used to sever or rupture a mass of the material of the member of the closed end from the member and displace such mass of material outwardly thereof. The present invention contemplates following the same procedure to a partial extent and then subject the displaced mass of material to endwise pressure by punches to swage or rivet a part of the displaced and severed mass of material into interlocked or substantially integral relationship with the remainder of the member 10 and thus seal or close the slot or recess from the exterior of the member.

Figure 7:
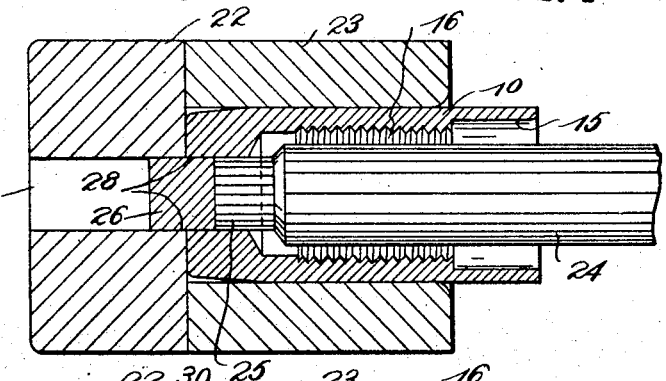
Fig. 7 is a somewhat schematic sectional view through a pair of die members and through an outer member of the fastening device located therein and illustrates one step in the method of making the outer member of the device.

In Fig. 7 there are shown two die elements 22 and 23 in the bore of the latter of which is mounted a member 10 which may have been previously bored and machined. A punch 24 is passed into the member 10 and the lower end 25 of the punch severs or ruptures a mass of the material indicated at 26 from the closed end of the member and forces the same outwardly of the member and partially into the bore 27 in the die member 22. It will be understood that the mass of material 26 is severed or ruptured from the member 10 along the lines 28 but that the inward movement of the punch 24 is stopped before the mass of material has been completely displaced with respect to the member 10 and entierly forced into the bore 27 of the die member or element 22.

Figure 8:
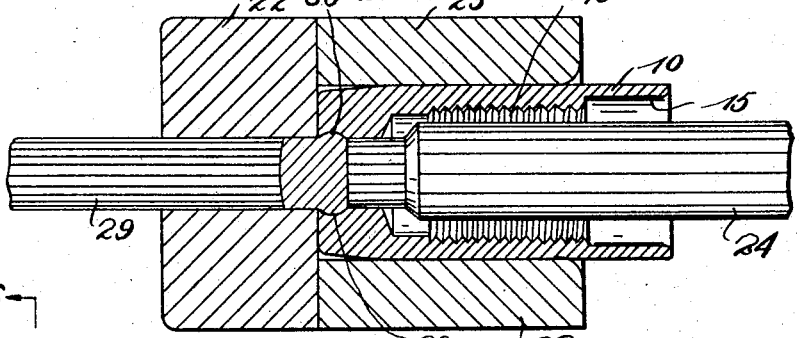
Fig. 8 is a view similar to Fig. 7 but illustrates another step in the manufacture of the outer member of the device.
Figures 5, 6:
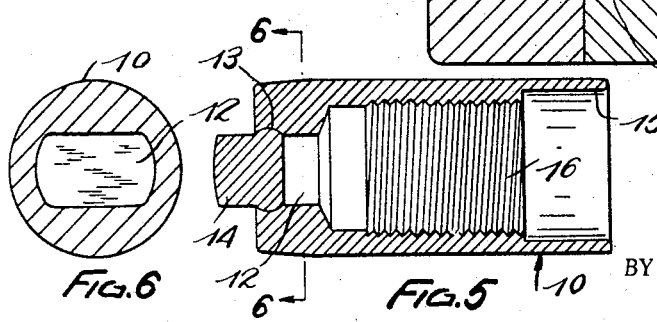
Fig. 5 is a longitudinal sectional view through the outer member of the device.
Fig. 6 is a transverse sectional view taken on line 6—6 of Fig. 5 looking in the direction of the arrows.

After the mass of material 26 has been severed or ruptured and moved to the position shown in Fig. 7, a backing rod or punch 29 is inserted in the bore 27 of the die element 22 until its inner end engages with the end of the displaced mass of material 26 after which the mass of material 26 is subjected to endwise pressure from either the punch 24 or the punch 29 or from both, with the result that that portion of the mass of material 26 that is still within the member 10 is forced or swaged outwardly, as indicated by the lines 30 in Fig. 8, into engagement with the material of the member 10, and then forms in effect an integral structure therewith, it being understood that the material of the die member or element 22 is much harder than the material of the member 10 and, therefore, when the mass 26 is subjected to the pressure exerted thereon by the punches 24 and 29 that portion of the mass of material within the member 29 will be swaged or displaced laterally into the material of the member 10 as clearly indicated.

It will be seen that by following the procedure just outlined in manufacturing the members 10 of the devices a simple and efficient way is followed for sealing the outer side of the recess or slot 12 without requiring any substantial changes or additions in the manufacturing process, thereby enabling the members to be made with their closed ends completely sealed, in as economic and efficient manner as said members had previously been made when the mass of material was completely displaced from the members and the ends of the members left with unsealed openings.

Although a preferred embodiment of the invention has been illustrated and described herein, it will be understood that the invention is susceptible of various modifications and adaptations within the scope of the appended claims.

Having thus described my invention I claim:

1. In a fastennig device to be secured to an opening in a plate, the combination of a thimble or outer member capable of being passed through said opening, said thimble having an expansible portion to lie adjacent to the edge of the opening and having an internal thread beyond said portion, an inner or expander member having threaded engagement with said thread and insertable through the opening and having a head for engagement with the edge of the opening in the plate, said expander member having a bore therethrough for the insertion of a tool to engage the end of the thimble remote from the opening, said remote end of the thimble being closed and sealed from the exterior and provided interiorly with a recess adapted to receive the end of said tool.

2. In a fastening device to be secured to an opening in a plate, the combination of a thimble or outer member capable of being passed through said opening, said thimble having an expansible portion to lie adjacent to the edge of the opening and having an internal thread beyond said portion, an inner or expander member having threaded engagement with said thread and insertable through the opening and having a head for engagement with the edge of the opening in the plate, said expander member having a bore therethrough for the insertion of a tool to engage the end of the thimble remote from the opening, said remote end of the thimble being closed and sealed from the exterior and provided interiorly with a recess adapted to receive the end of said tool and exteriorly with a projecting knob in alignment longitudinally of said thimble with said recess.

3. In a fastening device to be secured to an opening in a plate, the combination of a thimble or outer member capable of being passed through said opening, said thimble having an expansible portion to lie adjacent to the edge of the opening and having an internal thread beyond said portion, an inner or expander member having threaded engagement with said thread and insertable through the opening and having a head for engagement with the edge of the opening in the plate, said expander member having a bore therethrough for the insertion of a tool to engage the end of the thimble remote from the opening, said remote end of the thimble having a portion of the material thereof severed therefrom and displaced longitudinally of the thimble with a part of said material swaged into interlocking engagement with said thimble, whereby said remote end of said thimble is completely closed but is provided with an interior recess to receive the end of said tool.

4. The method of making the outer or thimble member of a fastening device of the character described which comprises placing the thimble in a suitable die, then by a punching operation severing or rupturing a portion of the end wall of said member and displacing said portion partially outwardly of the member, and then swaging said portion into interlocked relationship with said end wall.

5. The method of making the outer or thimble member of a fastening device of the character described which comprises placing the thimble in a suitable die, then by a punching operation severing or rupturing and displacing partially outwardly of said member a portion of the end wall thereof, and then subjecting said portion to a blow or pressure to swage a part thereof into interlocked relationship with said end wall.

6. The method of making the outer or thimble member of a fastening device of the character described which comprises placing the thimble in a suitable die, then by a punching operation severing or rupturing and displacing partially outwardly of said member a portion of the end wall thereof, and then subjecting said portion to pressure applied to the opposite ends thereof of swage a part thereof into interlocked relationship with said end wall.

JOHN C. CROWLEY.